US012764153B1

(12) United States Patent
Gabbay et al.

(10) Patent No.: US 12,764,153 B1
(45) Date of Patent: Oct. 13, 2026

(54) METHOD AND SYSTEM FOR SIMULATING A CYBERATTACK USING AN AI AGENT

(71) Applicant: Brava Security, LTD, Tel Aviv (IL)

(72) Inventors: Itay Gabbay, Tel Aviv (IL); Idan Basre, Tel Aviv (IL)

(73) Assignee: Brava Security, LTD, Tel Aviv (IL)

( * ) Notice: Subject to any disclaimer, the term of this patent is extended or adjusted under 35 U.S.C. 154(b) by 0 days.

(21) Appl. No.: 19/377,701

(22) Filed: Nov. 3, 2025

(51) Int. Cl.
*H04L 9/40* (2022.01)
*H04L 41/16* (2022.01)
*H04L 41/14* (2022.01)

(52) U.S. Cl.
CPC .......... *H04L 63/1433* (2013.01); *H04L 41/16* (2013.01); *H04L 41/145* (2013.01)

(58) Field of Classification Search
CPC .................................................. H04L 63/1433
See application file for complete search history.

(56) References Cited

U.S. PATENT DOCUMENTS 8,566,269 B2* 10/2013 Jajodia ................ H04L 41/0853 706/50
10,616,274 B1 4/2020 Chang et al.
11,431,734 B2* 8/2022 Seul ........................ G06F 17/15
11,777,970 B1 10/2023 Wainer
12,166,777 B2 12/2024 Frey et al.
12,445,477 B2* 10/2025 Koo .................... H04L 63/1433
2009/0320137 A1* 12/2009 White ................. H04L 63/1433 707/999.102
2019/0073406 A1 3/2019 Xu et al.
2020/0344256 A1* 10/2020 Alabdulhadi ......... H04L 63/205
2021/0194853 A1* 6/2021 Xiao ..................... H04L 43/028
2021/0234882 A1* 7/2021 Lee ...................... H04L 63/1441
2021/0329028 A1* 10/2021 Konda ................ H04L 63/0263
2022/0131889 A1* 4/2022 Scheideler .............. H04L 63/20
2022/0263860 A1* 8/2022 Crabtree ............. H04L 63/1425
2023/0224324 A1* 7/2023 Karabey ............. H04L 63/1466 726/23
2024/0143737 A1 5/2024 Zamir et al.
2024/0256780 A1* 8/2024 Douglas ................ G06F 21/577
2024/0289609 A1 8/2024 Birru et al.
2024/0406206 A1 12/2024 Boyer et al.
2024/0406210 A1 12/2024 Sellars et al.
2025/0343818 A1 11/2025 Immesoete
2025/0358296 A1 11/2025 Ray et al.

* cited by examiner

*Primary Examiner* — Simon P Kanaan
(74) *Attorney, Agent, or Firm* — M&B IP Analysts, LLC

(57) ABSTRACT

A method and system for simulating cyberattacks using AI agents is presented. The method includes parsing, by the at least one AI agent, contents of at least one incident report of at least one real cyberattack, wherein the contents of the at least one incident report include at least a known attack technique, a known attack tactic, and a known attack procedure; extracting, by the at least one AI agent, information from the at least one incident report that is relevant for simulating the at least one real cyberattack; assigning a cyberattack simulation task for the at least one AI agent, wherein the cyberattack simulation task includes at least an instruction to simulate the real cyberattack; and executing the cyberattack simulation task, by the at least one AI agent, on the sandboxed computing environment based on the extracted information.

19 Claims, 6 Drawing Sheets

METHOD AND SYSTEM FOR SIMULATING A CYBERATTACK USING AN AI AGENT

TECHNICAL FIELD

This disclosure generally relates to cybersecurity and, more particularly, to the mechanisms for detecting gaps in security logs using AI agents to simulate cyberattacks.

BACKGROUND

Event logs are chronological records generated by computer systems, applications, and network devices that capture activities, transactions, and security-related events. They can include user logins, file access, system errors, network traffic patterns, and security alerts, serving as a critical source of evidence for detecting and investigating cyber incidents. Ideally, they provide a reliable trail of what occurred in an environment, enabling security teams to identify malicious behavior, trace attack paths, and assess the impact of breaches.

However, some organizations may experience cyberattacks that are not reflected in their event logs. This can happen if logging is improperly configured, disabled, or limited to a narrow scope that misses key indicators of compromise. Attackers may also intentionally manipulate or delete logs to cover their tracks, using anti-forensic techniques to remove evidence. In other cases, systems might overwrite logs due to limited storage, or logs may never be collected from certain devices in the first place. The absence, corruption, or incompleteness of logs leaves organizations effectively blind to malicious activities, as there is no trustworthy record to confirm or analyze what took place. Without such visibility, security teams may remain unaware of breaches for extended periods, allowing attackers to persist undetected.

Cyberattack simulation is the controlled execution of attack scenarios within a network or system to evaluate an organization's defenses, monitoring capabilities, and response procedures. These exercises may mimic phishing campaigns, malware infections, lateral movement, or data exfiltration, aiming to measure how effectively existing tools and teams detect and respond to threats. Simulations can be conducted manually by penetration testers or automatically by specialized platforms, often without causing real damage.

One problem with cyberattack simulation is that it may not fully represent the complexity, unpredictability, or scale of genuine attacks. Real-world adversaries can adapt tactics dynamically, exploit unknown vulnerabilities, or operate over prolonged periods with stealth, while simulations often rely on predefined scenarios and known techniques. This can create a false sense of preparedness if defenders perform well in simulations but face entirely different or more sophisticated threats in reality. In such cases, organizations might overestimate their resilience and fail to identify critical gaps that a real attacker could exploit.

Therefore, it would be advantageous to provide a solution that would cure the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include parsing, by the at least one AI agent, contents of at least one incident report of at least one real cyberattack, where the contents of the at least one incident report include at least a known attack technique, a known attack tactic, and a known attack procedure. The method may also include extracting, by the at least one AI agent, information from the at least one incident report that is relevant for simulating the at least one real cyberattack. The method may furthermore include assigning a cyberattack simulation task for the at least one AI agent, where the cyberattack simulation task includes at least an instruction to simulate the real cyberattack. The method may in addition include executing the cyberattack simulation task, by the at least one AI agent, on the sandboxed computing environment based on the extracted information. Other embodiments of this aspect include corresponding computer systems, apparatus, and computer programs recorded on one or more computer storage devices, each configured to perform the actions of the methods.

In one general aspect, a non-transitory computer-readable medium may include one or more instructions that, when executed by one or more processors of a device, cause the device to: parse, by the at least one AI agent, contents of at least one incident report of at least one real cyberattack, where the contents of the at least one incident report include at least a known attack technique, a known attack tactic, and a known attack procedure; extract, by the at least one AI agent, information from the at least one incident report that is relevant for simulating the at least one real cyberattack; assign a cyberattack simulation task for the at least one AI agent, where the cyberattack simulation task includes at least an instruction to simulate the real cyberattack; and execute the cyberattack simulation task, by the at least one AI agent, on the sandboxed computing environment based on the extracted information. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: parse, by the at least one AI agent, contents of at least one incident report of at least one real cyberattack, where the contents of the at least one incident report at least a known attack technique, a known attack tactic, and a known attack procedure. The system may in addition extract, by the at least one AI agent, information from the at least one incident report that is relevant for simulating the at least one real cyberattack. The system may moreover assign a cyberattack simulation task for the at least one AI agent, where the cyberattack simulation task includes at least an instruction to simulate the real cyberattack. The system may also execute the cyberattack simulation task, by the at least one AI agent, on the sandboxed computing environment based on the extracted information. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
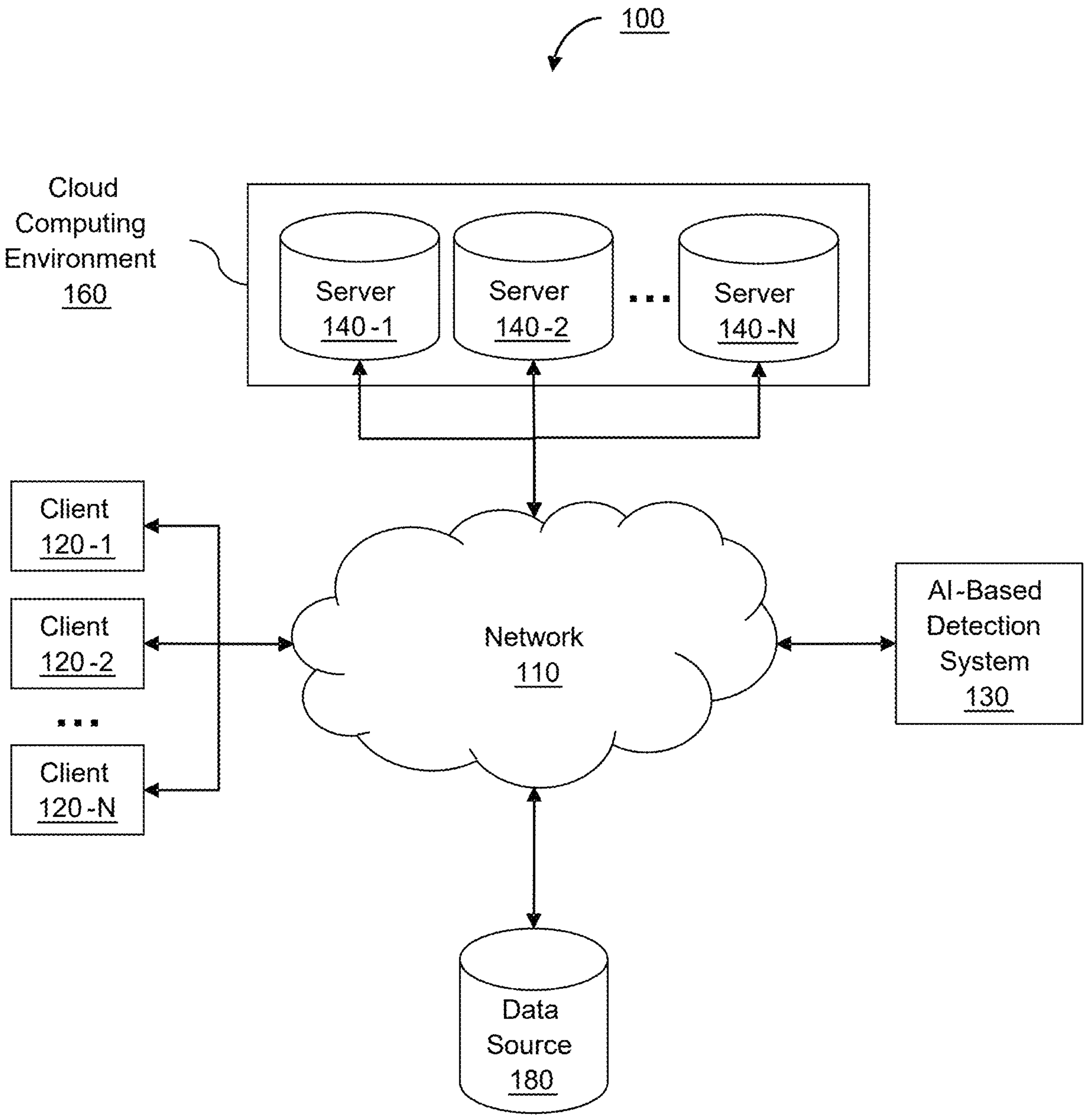
FIG. 1 shows an example network diagram utilized to describe the various disclosed embodiments.

It is important to note that the embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments present a method and system for detecting gaps in event logs by deploying artificial intelligence (AI) agents to autonomously simulate cyberattacks and using a large language model (LLM) to correlate the resulting event logs with the specific actions the AI agent performed. The disclosed method and system involves deploying the AI agents to execute a variety of offensive cyberattack techniques within a sandboxed computing environment. The LLM processes the event logs generated from the sandboxed computing environment and security tools during the cyberattack simulation and maps them to the actions taken by the AI agents, allowing for a granular understanding of any gaps between the simulated malicious operations and the event logs.

By using an AI agent capable of dynamically adapting its tactics during the simulation, organizations can observe how logging systems capture events from attacks that do not follow rigid, predefined patterns. This increases visibility into the nuanced behaviors of advanced threats, as the AI agent can mimic the unpredictability and persistence of real-world adversaries. Additionally, if the AI agent's documented actions are missing from the logs, improperly recorded, or misrepresented, the discrepancy becomes immediately visible. This creates a more accurate and context-rich view of how systems record malicious activity, improving the fidelity of event logs as a source of forensic evidence. This level of precision allows security teams to better understand the relationship between attacker behavior and system visibility.

It should be noted that the disclosed embodiments are operable for any agent architecture and toolchain and should not be limited to any one architecture and toolchain discussed hereinbelow. One such architecture, according to an embodiment, is the Model Context Protocol (MCP). Additionally, the disclosed embodiments are operable with any language model and is not limited to specific instruction formats for autonomous agents.

FIG. 1 shows an example network diagram 100 utilized to describe the various disclosed embodiments.

The network diagram 100 illustrated in FIG. 1 includes client device 120-1 through 120-N, where N is an integer greater than 1 (hereinafter, client 120 in the singular or clients 120 in the plural); server 140-1 through 140-N, where N is an integer greater than 1 (hereinafter, server 140 in the singular or servers 140 in the plural); data source 180, and AI-based detection system 130 all connected to network 110.

Client 120 may be a personal computer, a mobile phone, a smartphone, a tablet computer, a wearable device, or any compute device, and the like. Client 120 typically includes a processor and a memory that can be configured to execute script codes, software, HTTP/S pages, and the like. Client 120 may be operated by a legitimate user or a legitimate program.

As mentioned, servers 140 are deployed in cloud computing environment 160. Servers 140 deployed in the cloud computing platform 160 communicate with clients 120, AI-based detection system 130. In some embodiments, cloud computing environment 160 may be deployed in various configurations including, but not limited to, public, private, hybrid, or edge-based configurations. Examples of a cloud computing environment 160 include Amazon Web Services®, Microsoft Azure®, Google Cloud Platform™, IBM Cloud®, Oracle Cloud®, and the like.

AI-based detection system 130 is configured to receive incident reports and the like from data source 180. Data source 180 is a service that provides structured, actionable information about digital threats, vulnerabilities, malicious activity, deterministic attack simulation frameworks, a combination thereof, and the like. Data source 180 provides enrichment for security tools and analysts to more accurately detect, assess, and respond to risks in real time. For example, data source 180 may include commercial and open-source threat intelligence feeds, security vendors and information-sharing organizations, incident reports, open-source repositories, a combination thereof, and the like.

AI-based detection system 130 is configured to simulate a cyberattack that mimics the real cyberattack detailed in the received incident reports. The AI agent performs the simulated cyberattack on the sandboxed computing environment through various mechanisms including, but not limited to, Application Programming Interfaces (APIs). Simulating the cyberattack is discussed in more detail herein. The actions (hereinafter, operations or actions) performed by the AI agent as part of the simulated cyberattack are recorded and used for further analysis as discussed below.

AI-based detection system 130 is further configured receive to event logs triggered from the simulated cyberattack and the actions performed by the AI agent as part of the simulated cyberattack. Based on the received event logs and received actions, AI-based detection system 130 is configured to detect when an event log does not match an operation of the simulated cyberattack.

In some embodiments, AI-based detection system 130 is configured to compare the received event logs and recorded actions taken by the AI agent as part of the performance of the simulated cyberattack. This comparison serves to identify gaps in the event logs that fail to record certain operations that reflect attack techniques, tactics, and procedures used in real cyberattacks.

In some embodiments, AI-based detection system 130 is configured to utilize a language model trained to determine whether the operations match the event logs. A language model includes, but is not limited to, language models (for example, but not limited to, large language models, small language models, etc.), text-to-image artificial intelligence (AI) image generation systems, text-to-video AI video generators, combinations thereof, and the like. Embodiments related to the AI-based detection system are discussed in more detail hereinbelow.

It should be noted that the AI-based detection system 130 can be realized as a physical machine, or a virtual entity executed of a hardware layer. A virtual entity may include a virtual machine, a software container, a microservice, and the like.

An AI agent is a software system that perceives its environment, makes decisions, and takes actions autonomously to achieve specific goals using artificial intelligence techniques such as machine learning, reasoning, or natural language processing. AI agent may be realized in software. As used herein, the term "software" refers to one or more sequences of instructions, logic, or routines, including but not limited to source code, object code, intermediate code, interpretable code, or executable code, that may be stored on a non-transitory computer-readable medium and executed by one or more processors. The software may be implemented using one or more machine learning frameworks, including but not limited to TensorFlow™, PyTorch™, ONNX™, or equivalent platforms. The software may be executed in virtualized environments, such as containers or serverless architectures, or may be deployed via cloud infrastructure. The term "hardware" refers to one or more physical computing devices or components capable of performing operations, including model training, inference, and/or data processing. Non-limiting examples of hardware include: Central Processing Units (CPUs); Graphics Processing Units (GPUs); Tensor Processing Units (TPUs); Application-Specific Integrated Circuits (ASICs); Field Programmable Gate Arrays (FPGAs); Neural Processing Units (NPUs) or equivalent dedicated AI accelerators; On-device microcontrollers or edge processors capable of running trained models, and the like. The described embodiments are not limited to any particular implementation platform and may be deployed across heterogeneous environments comprising combinations of the above.

It should be noted that although one AI-based detection system 130 is illustrated in FIG. 1 for the sake of simplicity, the embodiments disclosed herein can be applied to a plurality of AI-based detection systems 130. Additionally, clients 120 may be in different geographical locations.

Figure 2:
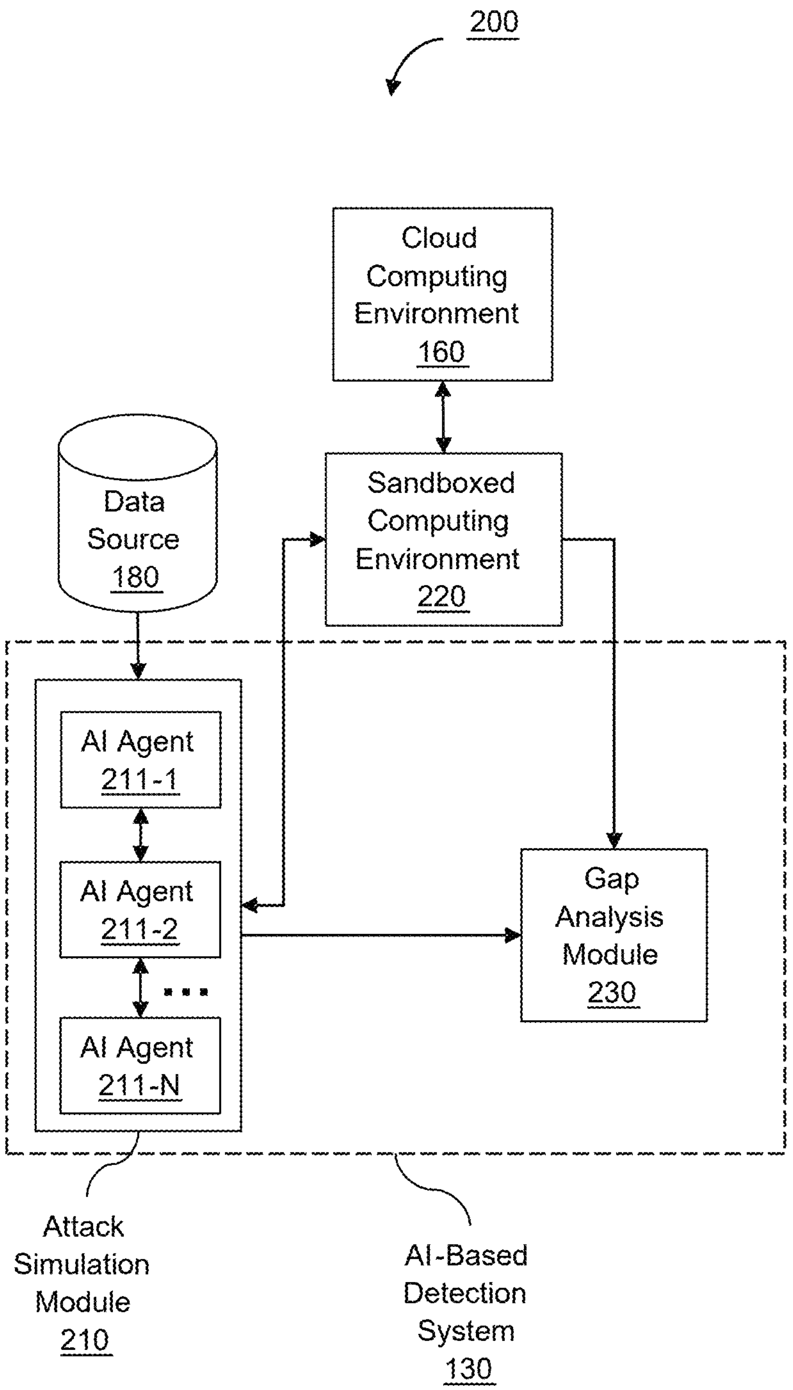
FIG. 2 is a functional diagram illustrating a process for detecting gaps in event logs through AI-agent-based cyberattack simulation according to an embodiment.

FIG. 2 is a functional diagram 200 illustrating a process for detecting gaps in event logs through AI-agent-based cyberattack simulation according to an embodiment. The process may be performed by the AI-based detection system 130, FIG. 1.

Autonomous agentic attack simulation module 210 is configured to receive incident reports from data source 180. Data source 180, as explained above, is a service that provides structured, actionable information about digital threats, vulnerabilities, malicious activity, deterministic attack simulation frameworks, a combination thereof, and the like. Data source 180 provides enrichment for security tools and analysts to more accurately detect, assess, and respond to risks in real time. For example, data source 180 may include commercial and open-source threat intelligence feeds, security vendors and information-sharing organizations, incident reports, open-source repositories, a combination thereof, and the like.

Autonomous agentic attack simulation module 210 includes agent 211-1 through 211-N, where N is an integer greater than 1 (hereinafter, agent 211 in the singular or agents 211 in the plural). Autonomous agentic attack simulation module 210, via agents 211, is configured to simulate a cyberattack on sandboxed computing environment 220 according to contents of the received incident reports. In some embodiments, autonomous agentic attack simulation module 210 includes one agent 211.

In some embodiments, agents 211 may communicate and coordinate in a network of agents 211. The network of agents 211 may communicate with one another via message passing (e.g., encoded in JSON, function calls, and the like), shared memory, and the like. In some embodiments, agents 211 may be instantiated as a specialized instance of a language model, and each agent 211 may further be configured for distinct roles. In an embodiment, agents 211 may operate synchronously through centralized orchestration. In other embodiments, agents 211 may be decentralized, using, for example, turn-based role delegation, task queues, and the like. Additionally, in some embodiments, agents 211 communicate using the Model Context Protocol (MCP), Agent2Agent Protocol (A2A), and the like.

It should be noted that utilizing a network (e.g., a plurality) of agents 211 as opposed to a single, generic agent ensures that each agent 211 is given a task that is efficiently achievable by each agent 211, thus allowing for accurate results and efficient computer processing.

In some embodiments, autonomous agentic attack simulation module 210 is configured to simulate a cyberattack by parsing, by agent 211, contents of an incident report of a real cyberattack; extracting, by agent 211, information from the incident report that is relevant for simulating the real cyberattack; assigning a cyberattack simulation task for the agent 211; executing the cyberattack simulation task, by the agent 211, on the sandboxed computing environment based on the extracted information.

In some embodiments, deploying a plurality of AI agents (agents 211) that are configured to communicate and coordinate together using a standardized protocol for AI agents further includes assigning a cyberattack simulation micro-task for each AI agent of the plurality of AI agents; and executing, by each AI agent, each cyberattack simulation micro-task to achieve the cyberattack simulation task. Each cyberattack simulation micro-task relates to the cyberattack simulation task. In some embodiments, each AI agent is configured with capabilities to access the at least one incident report and at least one resource in the sandboxed computing environment relevant to executing a respective cyberattack simulation micro-task.

In some embodiments, to execute the cyberattack simulation task, by the agent 211, to simulate the real cyberattack on the sandboxed computing environment, agent 211 of the autonomous agentic attack simulation module 210 is further configured to identify an operation that mimics the extracted information; perform the operation on the sandboxed computing environment; receive feedback from at least one resource in the sandboxed computing environment 220; and respond with at least one subsequent operation based on the feedback from the sandboxed computing environment 220. In some embodiments, the agent 211 is configured with capabilities to access the incident report and resources in the sandboxed computing environment 220.

Sandboxed computing environment 220 serves as a virtual container that mimics the tenant's actual computing environment (e.g., cloud computing environment 160, FIG. 1). The sandboxed computing environment 220 is an isolated, controlled environment used to safely execute the simulated cyberattack without risking harm to the host system. In some embodiments, the sandboxed computing environment 220 may be hosted locally on the same physical machine as the host but uses virtualization (e.g., virtual machines, containers, a combination thereof, and the like). In some embodiments, the sandboxed computing environment 220 is hosted on cloud-based servers deployed in various configurations including, but not limited to, public, private, hybrid, or edge-based configurations. Examples of a such cloud-based services include Amazon Web Services®, Microsoft Azure®, Google Cloud Platform™, IBM Cloud®, Oracle Cloud®, and the like.

Sandboxed computing environment 220 is configured to generate event logs in response to the simulated cyberattack from autonomous agentic attack simulation module 210. As sandboxed computing environment 220 is a virtualization of an actual tenant computing environment, the event logs triggered as a result of the simulated cyberattack emulate the event logs that would be triggered in the event of a real cyberattack.

Gap analysis module 230 is configured to receive operations (hereinafter operations or actions) used to simulate the cyberattack on the sandboxed computing environment 220 from autonomous agentic attack simulation module 210. Gap analysis module 230 is also configured to receive from sandboxed computing environment 220 event logs triggered in response to the simulated cyberattack.

Further, gap analysis module 230 is configured to detect when an event log does not match an action taken as part of the simulated cyberattack. When the event log does not match the action taken as part of the simulated cyberattack, a report is generated that includes the action. Detecting when an action taken as part of the simulated attack does not trigger an event log serves to identify blind spots in the event logs of a tenant organization and ensures that the tenant organization configures its security tools accordingly. The gap analysis is discussed in more detail herein.

It should also be noted that the configuration of the modules in FIG. 2 is not limited to the configuration demonstrated. In some embodiments, the configuration of the modules of the AI-based detection system 130 varies per tenant organization.

It should be understood that any "module" discussed herein may be implemented in various forms. Specifically, a module can be implemented in hardware, software, firmware, or any combination thereof, unless explicitly stated otherwise. The exact form of implementation may depend on design constraints, performance considerations, and application-specific requirements. The term "hardware" refers to one or more physical computing devices or components capable of performing operations, including model training, inference, and/or data processing. Non-limiting examples of hardware include are provided above. The described embodiments are not limited to any particular implementation platform and may be deployed across heterogeneous environments comprising combinations of the above.

Figure 3:
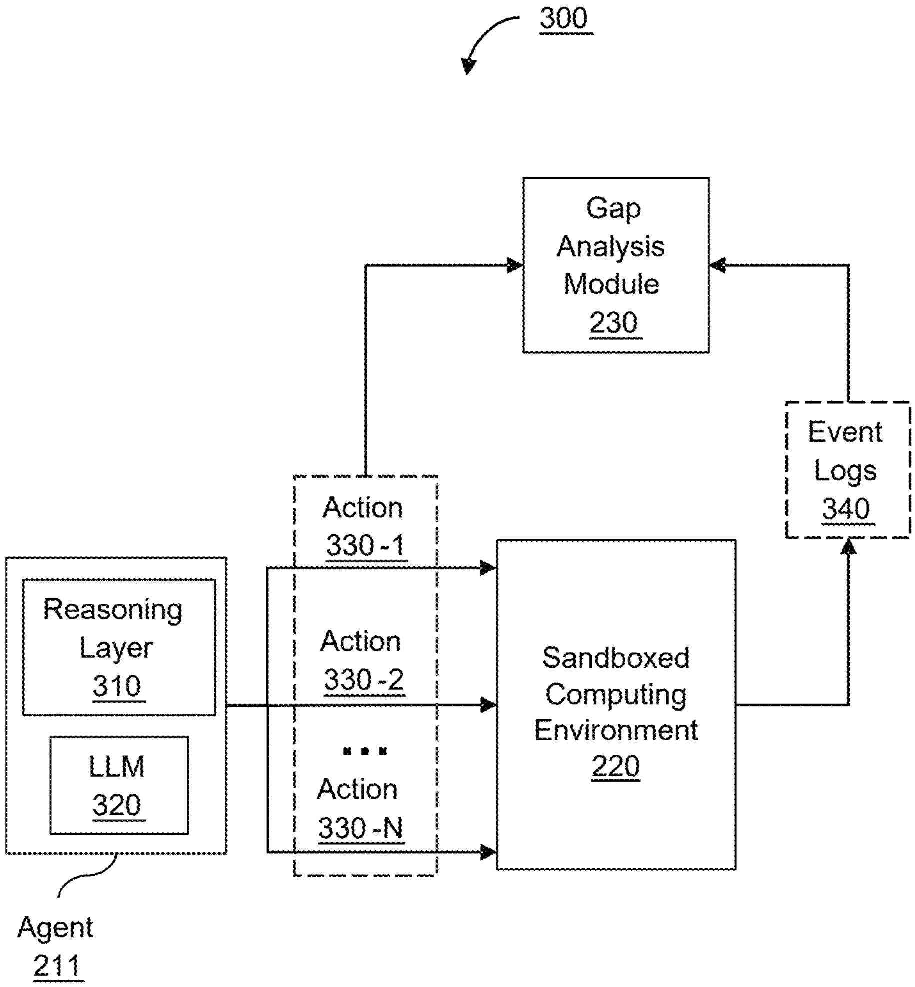
FIG. 3 is a functional diagram illustrating a process for detecting gaps in event logs through AI-agent-based cyberattack simulation according to an embodiment.

FIG. 3 is a functional diagram 300 illustrating a process for detecting gaps in event logs through AI-agent-based cyberattack simulation according to an embodiment. The process may be performed by the AI-based detection system 130, FIG. 1.

In an embodiment, agent 211 (e.g. agent 211, FIG. 2) is configured with a reasoning layer 310 and LLM 320. Reasoning layer 310 is configured to store reasoning logic. LLM 320 is configured to execute a prompt to generate a hidden representation (or simply internal state) that encapsulates context, tasks, and possible actions for the agent 211. Based on the internal state generated by the LLM 320, the reasoning layer 310 determines which actions 330-1 through 330-N to take, where N is an integer greater than 1 (hereinafter, action 330 in the singular, or actions 330 or action sequence 330 in the plural). In some embodiments, actions 330 involve simulating a cyberattack on sandboxed computing environment 220. Actions 330 are configured to be sent to gap analysis module 230 discussed in more detail herein.

In some embodiments, actions 330 may include, but are not limited to, generating a response for the AI-based detection system 130 or continuing to reason internally. If invoking a tool is necessary, agent 211 constructs a structured request that includes parameters needed by the tool. The tool is configured to execute a query and return a result. Once the tool returns a result, the result is re-ingested by LLM 320 along with the prior context, allowing agent 211 to update the internal state. LLM 320 is configured to generate the final response, incorporating both initial reasoning from a reasoning layer 310 and the result of the interaction with the tool.

In some embodiments, this thought-reasoning-action-response cycle may repeat multiple times if the problem requires iterative reasoning or multiple tools. In some embodiments, throughout the loop, memory and state management play a key role, ensuring continuity and coherence.

Sandboxed computing environment 220 is configured to generate event logs 340 in response to the actions 330 taken by agent 211 to simulate the cyberattack. These generated event logs 340 are configured to be sent to gap analysis module 230.

Gap analysis module 230 is configured to detect when an event log 340 does not match an action 330 taken as part of the simulated cyberattack. When the event log 340 does not match the at least action 330 taken as part of the simulated cyberattack, a report is generated that includes the action 330. Detecting when an action 330 taken as part of the simulated attack does not trigger an event log 340 serves to identify blind spots in the event logs of a tenant organization and ensures that the tenant organization configures its security tools accordingly.

It should also be noted that the configuration of the modules in FIG. 3 is not limited to the configuration demonstrated. In some embodiments, the configuration of the modules of the AI-based detection system 130 varies per tenant organization.

It should be understood that any "module" discussed herein may be implemented in various forms. Specifically, a module can be implemented in hardware, software, firmware, or any combination thereof, unless explicitly stated otherwise. The exact form of implementation may depend on design constraints, performance considerations, and application-specific requirements. The term "hardware" refers to one or more physical computing devices or components capable of performing operations, including model training, inference, and/or data processing. Non-limiting examples of hardware include are provided above. The described embodiments are not limited to any particular implementation platform and may be deployed across heterogeneous environments comprising combinations of the above.

Figure 4:
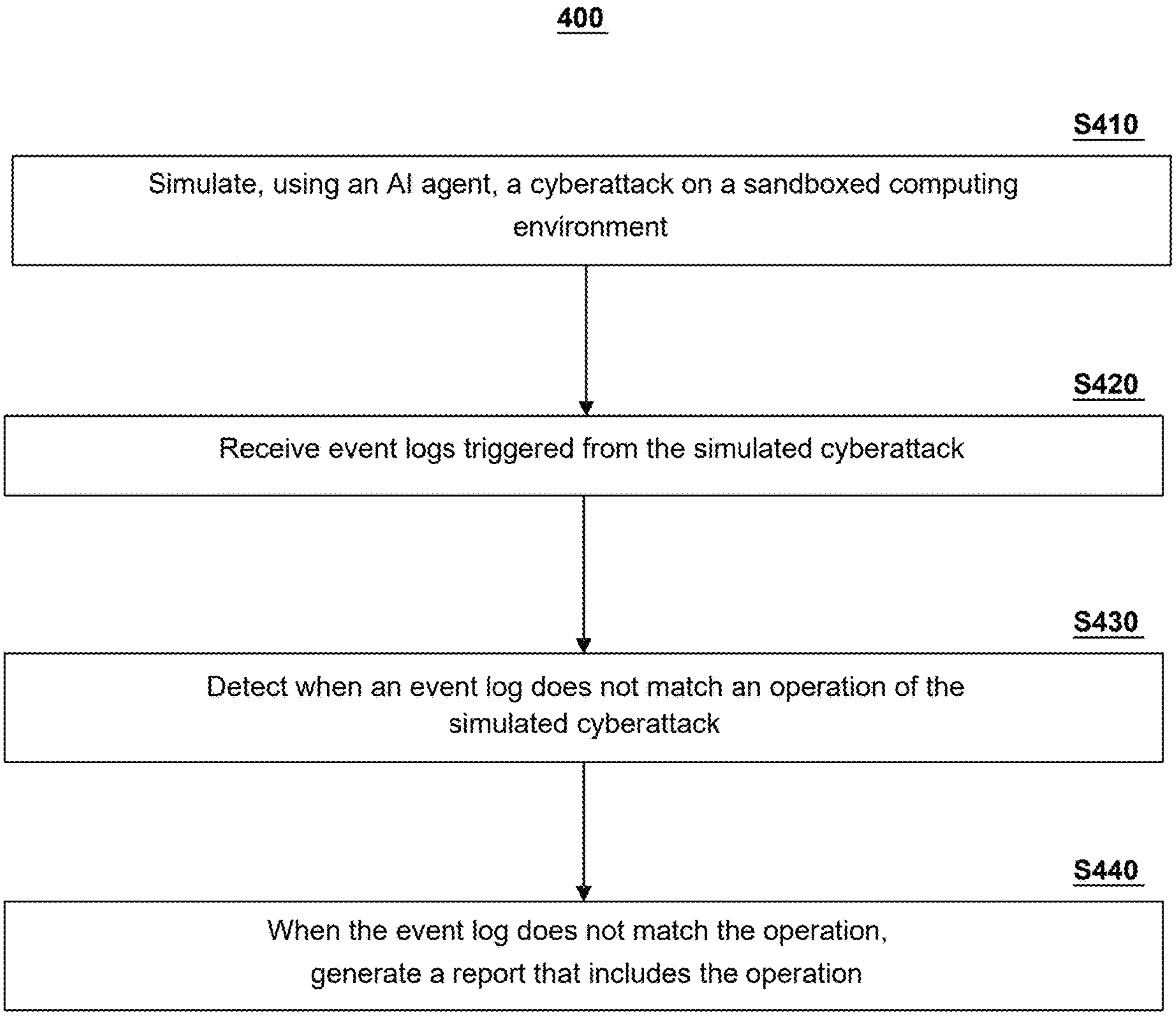
FIG. 4 is a flowchart of an example process for detecting gaps in event logs through an autonomous, AI-agent-based cyberattack simulation according to an embodiment.

FIG. 4 is a flowchart of an example process 400 for detecting gaps in event logs through an autonomous, AI-agent-based cyberattack simulation according to an embodiment. In some embodiments, process 400 is performed by AI-based detection system 130.

At S410, a cyberattack is simulated, using an AI agent, on a sandboxed computing environment.

The sandboxed computing environment serves as a virtual container that mimics the tenant's actual computing environment (e.g., cloud computing environment 160, FIG. 1). The sandboxed computing environment is an isolated, controlled environment used to safely execute the simulated cyberattack without risking harm to the host system. In some embodiments, the sandboxed computing environment may be hosted locally on the same physical machine as the host but uses virtualization (e.g., virtual machines, containers, a combination thereof, and the like). In some embodiments, the sandboxed computing environment is hosted on cloud-based servers deployed in various configurations including, but not limited to, public, private, hybrid, or edge-based configurations. Examples of a such cloud-based services include Amazon Web Services®, Microsoft Azure®, Google Cloud Platform™, IBM Cloud®, Oracle Cloud®, and the like.

The AI agent receives incident reports of real cyberattacks from various data sources (e.g., data source 180, FIG. 1). Based on the contents of the incident reports, the AI agent is configured to simulate a cyberattack that mimics the real cyberattack detailed in the incident reports. The AI agent performs the simulated cyberattack on the sandboxed computing environment through various mechanisms including, but not limited to, Application Programming Interfaces (APIs). Simulating the cyberattack is discussed in more detail herein.

Additionally, the actions performed by the AI agent as part of the simulated cyberattack are recorded and used for further analysis (e.g., at S430).

In some embodiments, simulating a cyberattack further includes parsing, by the AI agent, contents of an incident report of a real cyberattack; extracting, by the AI agent, information from the incident report that is relevant for simulating the real cyberattack; assigning a cyberattack simulation task for the AI agent; executing the cyberattack simulation task, by the AI agent, on the sandboxed computing environment based on the extracted information.

In some embodiments, executing the cyberattack simulation task to simulate the real cyberattack on the sandboxed computing environment further includes identifying an operation that mimics the extracted information; performing the operation on the sandboxed computing environment; receiving feedback from at least one resource in the sandboxed computing environment; and responding with at least one subsequent operation based on the feedback from the sandboxed computing environment. In some embodiments, executing the cyberattack simulation task to simulate the real cyberattack on the sandboxed computing environment further includes configuring the AI agent with capabilities to access the incident report and resources in the sandboxed computing environment.

At S420, event logs triggered from the simulated cyberattack are received.

In some embodiments, the event logs triggered from the simulated cyberattack are stored within the sandboxed computing environment. The sandboxed computing environment may store such event logs in an internal file system, temporary storage area, a combination thereof, and the like. In a cloud-based sandboxed computing environment, the event logs are stored on backend servers associated with the sandboxed computing environment. These logs are received (e.g., by AI-based detection system 130) from the sandboxed computing environment for analysis.

At S430, it is detected when an event log does not match an operation of the simulated cyberattack.

In some embodiments, detecting when an event log does not match an operation of the simulated cyberattack involves comparing the received event logs and recorded actions taken by the AI agent as part of the performance of the simulated cyberattack. Detecting when an event log does not match an operation taken by the AI agent during the simulated attack serves to identify gaps in the event logs that fail to record certain operations that reflect attack techniques, tactics, and procedures used in real cyberattacks.

In some embodiments, comparing operations executed by the AI agent as part of the simulated cyberattack to event logs includes utilizing a language model trained to determine whether the operations match the event logs. A language model includes, but is not limited to, language models (for example, but not limited to, large language models, small language models, etc.), text-to-image artificial intelligence (AI) image generation systems, text-to-video AI video generators, combinations thereof, and the like. This embodiment is discussed in more detail herein.

At S440, when the event log does not match the operation, a report is generated that includes the operation.

In some embodiments, generating a report includes listing all operations taken by the AI agent that do not appear in the generated event logs as a result of the simulated cyberattack, providing visibility into blind spots of the tenant organization being protected by the disclosed method and system.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
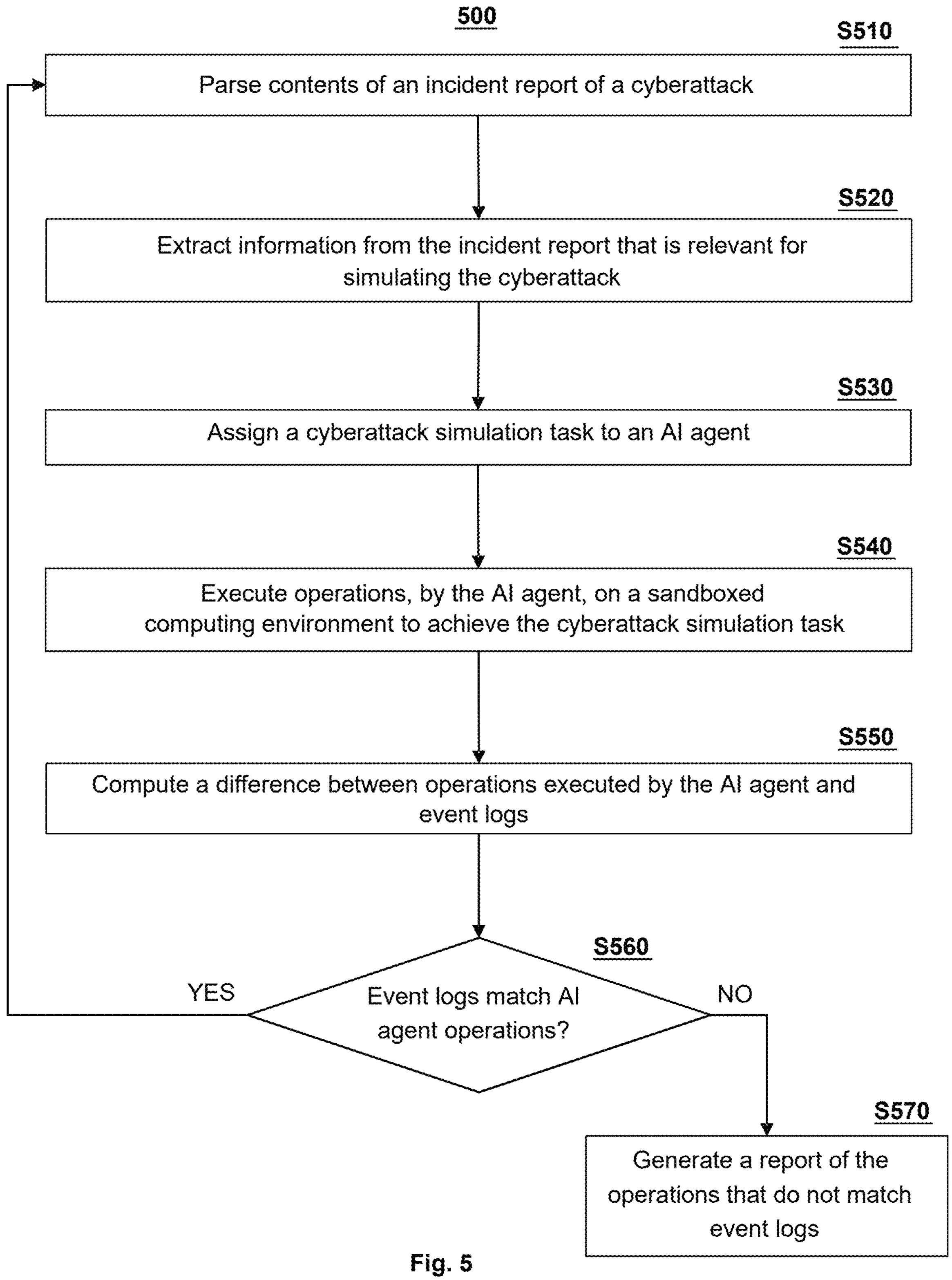
FIG. 5 shows an example flowchart illustrating a process for detecting gaps in event logs using an autonomous, AI-agent-based cyberattack simulation according to an embodiment.

FIG. 5 shows an example flowchart 500 illustrating a process for detecting gaps in event logs using an autonomous, AI-agent-based cyberattack simulation according to an embodiment. In some embodiments, the process is performed by AI-based detection system 130, FIG. 1.

At S510, contents of an incident report of the cyberattack are parsed. Incident reports are often written in natural language and vary in format, detail, and technical specificity. Incident reports are received from various data sources, threat intelligence sources, reputation services, a combination thereof, and the like.

In some embodiments, parsing involves analyzing the grammatic and syntactical structure of the natural language used in the incident report to identify entities (e.g., tools, commands, IPs), actions (e.g., executed, escalated), relationships, and sequences of events. In some embodiments, parsing contents of an incident report involves segmenting the contents of the incident report into logical components based on at least grammatical and syntactical structure of the contents. Logical components include, but are not limited to, summary, timeline, technical analysis, impact, and indicators of compromise. In some embodiments, parsing may involve using natural language processing (NLP), named entity recognition (NER), a combination thereof, and the like to identify such logical components.

At S520, information from the incident report that is relevant for simulating the cyberattack is extracted.

In some embodiments, extracting, by the AI agent, information from the incident report that is relevant for simulating the cyberattack includes identifying which parsed contents are sufficiently relevant to simulating the real cyberattack and labeling the identified contents with semantic identifiers.

Extracting relevant information includes semantic filtering. Extracting such information includes identifying entities such as malware names, file paths, command-line inputs, registry keys, IP addresses, and software components. Extracting such information also involves identifying attacker behaviors such as executing scripts, disabling defenses, or establishing persistence. These extracted elements are tagged with semantic identifiers (e.g., metadata), such as time of occurrence, affected systems, and associated outcomes, which gives them cyber-relevant meaning beyond raw text.

In some embodiments, the extracted relevant information may be translated into a formal representation using a framework like MITRE ATT&CK. For example, each action extracted may be translated to a specific tactic (the goal) and technique (the method). For instance, "ran a PowerShell command to disable AV" gets translated to Execution (TA0002) with Technique T1059.001 (PowerShell) and possibly Defense Evasion (TA0005) with T1562.001 (Disable or Modify Tools). This structured translation enables the AI agent to build a timeline of actions that mirrors a real-world attack chain, but in terms that are standardized and module.

At S530, a cyberattack simulation task is assigned to an AI agent. The cyberattack simulation task includes at least an instruction to simulate the operations of used in a real cyberattack extracted from the incident report.

In some embodiments, the cyberattack simulation task includes tools that can be invoked by the AI agent to parse (S510), extract (S520), perform operations on the sandboxed computing environment, a combination thereof, and the like. Additionally, in some embodiments, the AI agent is configured with a reasoning layer that enables the AI agent to determine which tools to invoke and which actions to take to simulate the cyberattack.

At S540, operations are executed, by the AI agent, on a sandboxed computing environment to achieve the cyberattack simulation task.

Based on the extracted relevant information of the incident reports and the cyberattack simulation task, the AI agent is configured to execute operations to achieve the cyberattack simulation task to mimic the real cyberattack detailed in the incident report. In some embodiments, the AI agent executes operations to perform the simulated cyberattack on the sandboxed computing environment through various mechanisms including, but not limited to, Application Programming Interfaces (APIs).

At S550, operations executed by the AI agent are compared to event logs.

In some embodiments, comparing operations executed by the AI agent as part of the simulated cyberattack to event logs includes utilizing a language model. A language model includes, but is not limited to, language models (for example, but not limited to, large language models, small language models, etc.), text-to-image artificial intelligence (AI) image generation systems, text-to-video AI video generators, combinations thereof, and the like.

In some embodiments, the language model compares the operations to the event logs by first transforming each into high-dimensional vector representations (e.g., embeddings) stored in a high-dimensional embedding space. These embeddings encode semantic features, such as explicit and contextual meaning, learned during training of the language model. For example, the language model embeds the textual descriptions of the event log and the operations into the high-dimensional vector space. The proximity of these vectors, measured by similarity metrics such as, but not limited to, cosine similarity, dot product, and the like, provides a quantitative indication of how close the semantic relation is between the event log and the operations. This comparison serves to identify gaps in the event logs that fail to record certain operations that reflect attack techniques, tactics, and procedures used in real cyberattacks.

For example, a single action like "inject malicious payload on port 443" is represented as a vector embedding that captures the role of that action in the simulated cyberattack. Similarly, an event log entry such as "detected anomalous TLS handshake on port 443" is represented as a vector embedding that captures the meaning of the event log entry in the context of the event log. By comparing these embeddings, the model can detect that the event log entry and the simulated action are semantically related.

At S560, it is determined whether the event logs match AI agent operations. If YES, execution returns with S510. If NO, execution proceeds with S570.

When there is a sufficient deviation between an event log entry and an operation of the simulated cyberattack, it is determined that the event logs do not match AI agent operations. In some embodiments, when a distance metric between the vector embedding for an event log entry and the vector embedding for the operation is above a predetermined threshold, it is determined that there is a sufficient deviation between the event log entry and the operation.

Comparing operations involved in the simulated cyberattack and the event logs triggered by the attack serves to detect when an event log does not match an operation taken by the AI agent during the simulated attack.

At S570, a report is generated that includes the operations that do not match event logs.

In some embodiments, generating a report includes listing all operations taken by the AI agent that do not appear in the generated event logs as a result of the simulated cyberattack, providing visibility into blind spots of the tenant organization being protected by the disclosed method and system.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
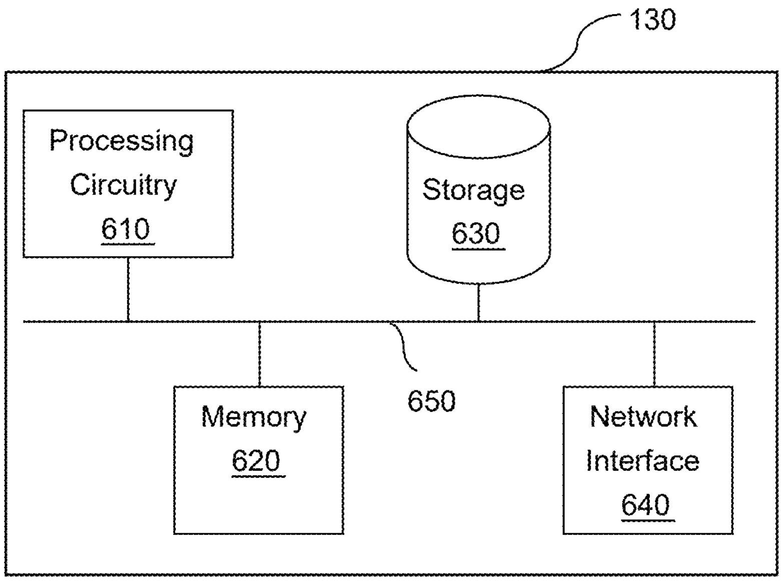
FIG. 6 is an example block diagram of a hardware architecture of a compute device.

FIG. 6 is an example block diagram of a hardware architecture 600 of a compute device 600. In an embodiment, the AI-based detection system 130 can be realized using the hardware architecture 600.

The hardware architecture 600 includes a processing circuitry 610 coupled to a memory 620, a storage 630, and a network interface 640. In an embodiment, the components may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), graphics processing units (GPUs), system-on-a-chip systems (SOCs), general-purpose microprocessors, microcontrollers, digital signal processors (DSPs), and the like, or any other hardware logic components that can perform calculations or other manipulations of information.

In at least some embodiments, the processing circuitry 610 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 610 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like.

In accordance with various such embodiments, the hardware utilized for the processing circuitry 610 is selected in order to enable genAI functionality based on factors such as, but not limited to, parallelism (e.g., amounts of parallel processing to be performed), memory demands (e.g., amounts of random access memory [RAM] utilized to store model weights and training during processing or video RAM [VRAM] to support large language models), clock speeds, thread counts, storage (for example, to support certain amounts of storage or storage speeds), cooling (e.g., liquid cooling or air cooling systems), power supply (e.g., in order to enable a target wattage used for certain kinds of activities), networking and connectivity (e.g., in order to support seamless data transfer for deployments involving communications between or among multiple machines or clusters), combinations thereof, and the like.

In embodiments which utilize large language models (LLMs) or otherwise perform operations which may require or be enhanced through use of parallel processing, the processing circuitry 610 may include one or more GPUs or other processing units suitable for parallel processing. Such GPUs may be configured to perform matrix multiplication operations including, but not limited to, performing dot product operations in order to support neural network operations (for example, by performing dot product operations for hidden layer computations) or performing dot product operations in an attention mechanism in order to compute a similarity score between vectors during attention weight computation. In at least some such embodiments using GPUs, the processing circuitry 610 may include a number of CPU cores which is equal to or greater than the number of GPUs in order to facilitate or otherwise support parallel processing via multiple GPUs.

The memory 620 may be volatile (e.g., RAM, etc.), non-volatile (e.g., ROM, flash memory, etc.), or any combination thereof. In one configuration, computer-readable instructions needed to implement one or more embodiments disclosed herein may be stored in the storage 630.

In another embodiment, the memory 620 is configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by the one or more processors, cause the processing circuitry 610 to perform the various processes described herein.

The storage 630 may be magnetic storage, optical storage, and the like, and may be realized, for example, as flash memory or other memory technology, CD-ROM, Digital Versatile Disks (DVDs), hard drives, SSD, or any other medium which can be used to store the desired information, such as log of transactions, public keys, and so on. The storage 630 may include the various access policies and games.

The network interface 640 allows the client 120 to communicate with the Internet or a local area network. The network interface 640 communication with these elements.

It should be understood that the embodiments described herein are not limited to the specific architecture illustrated in FIG. 6 and that other architectures may be equally used without departing from the scope of the disclosed embodiments.

It should be further noted that AI-based detection system 130 may be realized using a computing architecture similar to the architecture illustrated in FIG. 6, but that other architectures may be equally used without departing from the scope of the disclosed embodiments. Further, the memory 620 may include instructions for executing the function of the respective device.

The various embodiments disclosed herein can be implemented as any combination of hardware, firmware, and software. Moreover, the software is preferably implemented as an application program tangibly embodied on a program storage unit or computer-readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

It should be understood that any reference to an element herein using a designation such as "first," "second," and so forth does not generally limit the quantity or order of these elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the groups consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to further the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for simulating cyberattacks using AI agents, comprising:

parsing, by at least one AI agent, contents of at least one incident report of at least one cyberattack, wherein the contents of the at least one incident report include at least a known attack technique, a known attack tactic, and a known attack procedure;

extracting, by the at least one AI agent according to a reasoning logic stored in a reasoning layer of the at least one AI agent, information from the at least one incident report;

assigning a cyberattack simulation task for the at least one AI agent, wherein the cyberattack simulation task includes at least an instruction for the at least one AI agent to simulate the cyberattack; and executing, by the at least one AI agent, at least one operation on a sandboxed computing environment, wherein the reasoning layer of the at least one AI agent is configured to determine, based on the extracted information and according to the reasoning logic, the at least one operation to be executed to achieve the cyberattack simulation task.

2. The method of claim 1, further comprising:

computing a difference between the at least one operation involved in executing the cyberattack simulation task and at least one event log triggered in response to executing the cyberattack simulation task;

when the difference between the at least one operation and at least one event log exceeds a predetermined threshold, generating a report that includes the at least one operation.

3. The method of claim 1, wherein executing the at least one operation, by the at least one AI agent, on the sandboxed computing environment, further comprises:

identifying, by the at least one AI agent, the at least one operation that mimics the extracted information;

performing, by the at least one AI agent, the at least one operation on the sandboxed computing environment;

receiving feedback from at least one resource in the sandboxed computing environment; and responding, by the at least one AI agent, with at least one subsequent operation based on at least the feedback from the sandboxed computing environment.

4. The method of claim 1, further comprising:

configuring the at least one AI agent with capabilities to access the at least one incident report and at least one resource in the sandboxed computing environment.

5. The method of claim 1, wherein parsing, by the at least one AI agent, at least one incident report of the at least one cyberattack further comprises:

segmenting the contents of the at least one incident report into logical components based on at least grammatical and syntactical structure of the contents.

6. The method of claim 1, wherein extracting, by the at least one AI agent according to the reasoning logic stored in the reasoning layer of the at least one AI agent, information from the at least one incident report further comprises:

labeling the extracted information with semantic identifiers.

7. The method of claim 1, further comprising:

deploying a plurality of AI agents that are configured to communicate and coordinate together using a standardized protocol for AI agents.

8. The method of claim 7, further comprising:

assigning a cyberattack simulation micro-task for each AI agent of the plurality of AI agents, wherein each cyberattack simulation micro-task relates to the cyberattack simulation task; and executing, by each AI agent of the plurality of AI agents, each cyberattack simulation micro-task to achieve the cyberattack simulation task.

9. The method of claim 8, further comprising:

configuring each AI agent of the plurality of AI agents with capabilities to access the at least one incident report and at least one resource in the sandboxed computing environment to execute a respective cyberattack simulation micro-task.

10. A non-transitory computer-readable medium storing a set of instructions for simulating cyberattacks using AI agents, the set of instructions comprising:

one or more instructions that, when executed by one or more processors of a device, cause the device to:

parse, by at least one AI agent, contents of at least one incident report of at least one cyberattack, wherein the contents of the at least one incident report include at least a known attack technique, a known attack tactic, and a known attack procedure;

extract, by the at least one AI agent according to a reasoning logic stored in a reasoning layer of the at least one AI agent, information from the at least one incident report;

assign a cyberattack simulation task for the at least one AI agent, wherein the cyberattack simulation task includes at least an instruction for the at least one AI agent to simulate the cyberattack; and execute, by the at least one AI agent, at least one operation on a sandboxed computing environment, wherein the reasoning layer of the at least one AI agent is configured to determine, based on the extracted information and according to the reasoning logic, the at least one operation to be executed to achieve the cyberattack simulation task.

11. A system for simulating cyberattacks using AI agents comprising:

a processing circuitry;

a memory, the memory containing instructions that, when executed by the processing circuitry, configure the system to:

parse, by at least one AI agent, contents of at least one incident report of at least one cyberattack, wherein the contents of the at least one incident report include at least a known attack technique, a known attack tactic, and a known attack procedure;

extract, by the at least one AI agent according to a reasoning logic stored in a reasoning layer of the at least one AI agent, information from the at least one incident report;

assign a cyberattack simulation task for the at least one AI agent, wherein the cyberattack simulation task includes at least an instruction for the at least one AI agent to simulate the cyberattack; and execute, by the at least one AI agent, at least one operation on a sandboxed computing environment, wherein the reasoning layer of the at least one AI agent is configured to determine, based on the extracted information and according to the reasoning logic, the at least one operation to be executed to achieve the cyberattack simulation task.

12. The system of claim 11, wherein the memory contains further instructions which when executed by the processing circuitry further configure the system to:

compute a difference between the at least one operation involved in executing the cyberattack simulation task and at least one event log triggered in response to executing the cyberattack simulation task; and when the difference between the at least one operation and at least one event log exceeds a predetermined threshold, generate a report that includes the at least one operation.

13. The system of claim 11, wherein the memory contains further instructions that, when executed by the processing circuitry for executing the at least one operation, by the at least one AI agent, on the sandboxed computing environment, further configure the system to:

identify, by the at least one AI agent, the at least one operation that mimics the extracted information;

perform, by the at least one AI agent, the at least one operation on the sandboxed computing environment;

receive feedback from at least one resource in the sandboxed computing environment; and respond, by the at least one AI agent, with at least one subsequent operation based on at least the feedback from the sandboxed computing environment.

14. The system of claim 11, wherein the memory contains further instructions which when executed by the processing circuitry further configure the system to:

configure the at least one AI agent with capabilities to access the at least one incident report and at least one resource in the sandboxed computing environment.

15. The system of claim 11, wherein the memory contains further instructions that, when executed by the processing circuitry for parsing, by the at least one AI agent, at least one incident report of the at least one cyberattack, further configure the system to:

segment the contents of the at least one incident report into logical components based on at least grammatical and syntactical structure of the contents.

16. The system of claim 11, wherein the memory contains further instructions that, when executed by the processing circuitry for extracting, by the at least one AI agent according to the reasoning logic stored in the reasoning layer of the at least one AI agent, information from the at least one incident report, further configure the system to:

label the extracted information with semantic identifiers.

17. The system of claim 11, wherein the memory contains further instructions which when executed by the processing circuitry further configure the system to:

deploy a plurality of AI agents that are configured to communicate and coordinate together using a standardized protocol for AI agents.

18. The system of claim 17, wherein the memory contains further instructions which when executed by the processing circuitry further configure the system to:

assign a cyberattack simulation micro-task for each AI agent of the plurality of AI agents, wherein each cyberattack simulation micro-task relates to the cyberattack simulation task; and execute, by each AI agent of the plurality of AI agents, each cyberattack simulation micro-task to achieve the cyberattack simulation task.

19. The system of claim 18, wherein the memory contains further instructions which when executed by the processing circuitry further configure the system to:

configure each AI agent of the plurality of AI agents with capabilities to access the at least one incident report and at least one resource in the sandboxed computing environment to execute a respective cyberattack simulation micro-task.

* * * * *